United States Patent
Roul et al.

(10) Patent No.: US 10,051,339 B2
(45) Date of Patent: Aug. 14, 2018

(54) METHOD FOR GENERATING AND TRANSFERRING AT LEAST ONE DATA STREAM

(71) Applicant: ENENSYS TECHNOLOGIES, Cesson Sevigne (FR)

(72) Inventors: Laurent Roul, Cesson Sevigne (FR); Ludovic Poulain, Cesson Sevigne (FR); Bernard Pichot, Cesson Sevigne (DE)

(73) Assignee: ENENSYS TECHNOLOGIES, Cesson Sevigne (FR)

( * ) Notice: Subject to any disclaimer, the term of this patent is extended or adjusted under 35 U.S.C. 154(b) by 0 days.

(21) Appl. No.: 14/650,896

(22) PCT Filed: Dec. 12, 2013

(86) PCT No.: PCT/EP2013/076336
§ 371 (c)(1),
(2) Date: Dec. 3, 2015

(87) PCT Pub. No.: WO2014/090928
PCT Pub. Date: Jun. 19, 2014

(65) Prior Publication Data
US 2016/0080828 A1    Mar. 17, 2016

(30) Foreign Application Priority Data
Dec. 13, 2012    (FR) ..................... 12 61998

(51) Int. Cl.
*H04N 7/20*      (2006.01)
*H04N 21/647*    (2011.01)
(Continued)

(52) U.S. Cl.
CPC ... *H04N 21/64792* (2013.01); *H04N 21/6143* (2013.01); *H04N 21/64315* (2013.01)

(58) Field of Classification Search
CPC ......... H04N 21/8456; H04N 21/44222; H04N 21/4423; H04N 21/4385; H04N 21/2389
(Continued)

(56) References Cited

U.S. PATENT DOCUMENTS

| 2010/0103950 A1* | 4/2010 | Statelov | H04N 21/23432 370/468 |
| 2012/0307842 A1* | 12/2012 | Petrov | H04N 21/23608 370/474 |

(Continued)

FOREIGN PATENT DOCUMENTS

| WO | 2008111921 | 9/2008 |
| WO | 2011048230 | 4/2011 |

OTHER PUBLICATIONS

International Search Report, Mar. 31, 2014.
(Continued)

*Primary Examiner* — Jivka Rabovianski
(74) *Attorney, Agent, or Firm* — Greer, Burns & Crain, Ltd.

(57) ABSTRACT

A method for generating a stream from first and second data streams received, the data streams comprising frames, each frame containing a synchronization packet, a signaling packet giving information on the structure of the data stream and packets referred to as baseband frames. The method comprises the steps of aligning the two data streams received by putting in phase the synchronization packets or the signaling packets of the frames of each data stream, identifying, in one of the data streams received, baseband packets identifying packets of a first type, and inserting, in each frame of the first stream received, baseband packets of the frame of the second stream the synchronization packet of which is aligned with the synchronization packet of the frame of the first stream.

14 Claims, 5 Drawing Sheets

| Bo | PLP1 | Bo | PLP1 | Bo | PLP1 | Timestamp | L1PRE |

(51) Int. Cl.
*H04N 21/61* (2011.01)
*H04N 21/643* (2011.01)

(58) Field of Classification Search
USPC .............................................. 725/19, 22, 67
See application file for complete search history.

(56) References Cited

U.S. PATENT DOCUMENTS

2013/0121229 A1\* 5/2013 Vare ...................... H04H 20/22
370/312
2013/0215328 A1\* 8/2013 Lhermitte .............. H04H 20/18
348/500

OTHER PUBLICATIONS

DVB Organization, Digital Video Broadcasting, Sep. 15, 2009.
"Local Content in DVB-T2 Systems with SFN", Tommy Jensen, Sep. 12, 2012.

\* cited by examiner

| Bo | PLP1 | Bo | PLP1 | L1PREor | PLP1 | Timestamp | L1PREm |

Fig. 7d

| PLP0 | Bo | PLP0 | Bo | PLP0 | L1PREor | Timestamp | L1PREm |

Fig. 7e

| BB0 | BB1 | BB2 | BB3 | BB4 | BB5 | Timestamp | L1PRE |

Fig. 7f

| Bo | BB1 | Bo | BB3 | Bo | BB5 | Timestamp | L1PRE |

Fig. 7g

| BB0 | Bo | BB2 | Bo | BB4 | Bo | Timestamp | L1PRE |

Fig. 7h

METHOD FOR GENERATING AND TRANSFERRING AT LEAST ONE DATA STREAM

CROSS-REFERENCES TO RELATED APPLICATIONS

This application claims the benefit of the French patent application No. 1261998 filed on Dec. 13, 2012, the entire disclosures of which are incorporated herein by way of reference.

BACKGROUND OF THE INVENTION

The present invention relates to the field of the broadcasting of digital television programs and more particularly a method for generating and transferring at least one data stream in accordance with the DVB-T2 (Digital Video Broadcast) standard.

Historically, the ETSI (European Telecommunications Standards Institute) proposed a first standard, DVB-S, for broadcasting programs by satellite. This standard was divided into the standards DVB-C for cable network broadcasting and DVB-T for terrestrial broadcasting. These standards are referred to as first-generation DVB standards.

These standards share a common base. The programs are composed of multiplexed audio and video streams to which signaling information is added in the form of signaling tables known as SI/PSI (Service Information/Program Specific Information) tables. The resulting multiplexed stream is encapsulated in a transport layer in accordance with the MPEG-2 TS (Moving Picture Experts Group 2 Transport Stream) standard for broadcasting. These standards have certainly been successful and constitute a widespread television broadcasting technology.

At the present time, a new generation of these standards is being developed. In particular, terrestrial broadcasting is standardized in the form of a DVB-T2 standard. This new standard makes it possible to aggregate, in the same stream, several physical-layer tunnels referred to as PLPs (Physical Layer Pipes). Each of these physical layer tunnels consists of a multiplex of programs in a transport stream of the MPEG-2TS type having its own modulation parameters. These tunnels are connected together in a stream referred to as a T2-MI (Modulator Interface) stream. The T2-MI stream is itself encapsulated in a new layer of the MPTS (Multiple Program Transport Stream) type. The T2-MI stream comprises T2-MI data packets such as T2-MI timestamp synchronization packets, signaling packets including the current packet called TS-MI L1, which gives information on the structure of the T2-MI stream, and packets referred to as baseband frames containing the data of the MPEG-2 TS streams of the various tunnels. The T2-MI packets are organized in T2 frames, and each T2 frame contains a timestamp T2-MI packet, a current T2-MI L1 packet and baseband frame packets.

The T2-MI streams are synchronized by means of T2-MI timestamp packets so as to allow a synchronous broadcasting within an SFN (Single Frequency Network). These networks consist of a plurality of transmitters broadcasting the same DBV-T2 radio signal on the same frequency. This broadcasting mode is possible only if the transmitters are synchronized and the DVB-T2 radio signals transmitted are identical to within one bit, otherwise interferences will be generated in the areas covered by the transmissions of at least two transmitters.

The T2-MI streams are conventionally transmitted to at least one satellite which in return broadcasts these streams in a given geographical area. The streams broadcast by the at least one satellite are then received, modulated and retransmitted by terrestrial broadcasting stations.

The use of satellites in the transmission chain has an impact on the financial cost of the transmission. This is because the cost price of a transmission by means of a satellite depends on the bandwidth used for the transmission.

In addition, the bandwidth available in a satellite is limited and it would therefore be judicious to reduce the bandwidth necessary for the transmission of such T2-MI streams by means of a satellite.

SUMMARY OF THE INVENTION

The invention aims to solve the aforementioned problems by proposing a method for reducing the bit rate of a data stream in accordance with the DVP-T2 standard transmitted by means of a satellite.

The invention relates to a method for transferring a data stream, the data stream comprising frames, each frame containing a synchronization packet, a signaling packet giving information on the structure of the data stream and packets referred to as baseband frames comprising data on audiovisual streams, characterized in that the method comprises the steps of:
identifying, among the baseband frame packets, packets of a first type,
modifying the header of each baseband frame packet identified as a packet of the first type,
replacing the useful data included in a useful data field of each identified packet with information indicating that the packet is a packet of the first type, the information indicating that the packet is a packet of the first type having a size less than the size of the useful data replaced,
transferring the modified data stream.

The invention also relates to a device for transferring a data stream, the data stream comprising frames, each frame containing a synchronization packet, a signaling packet giving information on the structure of the data stream and packets referred to as baseband frames comprising data on audiovisual streams, characterized in that the device comprises the steps of:
means for identifying, among the baseband frame packets, packets of a first type,
means for modifying the header of each baseband frame packet identified as a packet of the first type,
means for replacing the useful data included in a useful data field of each identified packet with information indicating that the packet is a packet of the first type, the information indicating that the packet is a packet of the first type having a size less than the size of the useful data replaced,
means for transferring the modified data stream.

Thus the bandwidth necessary for transmitting the data stream by means of a satellite is reduced while preserving the data necessary for the synchronous broadcasting of the data stream in a single frequency network SFN.

According to a particular embodiment of the invention, the baseband frame packets belong to various tunnels and the packets of the first type are the packets of the same tunnel.

Thus, by transmitting only data of a single tunnel, the data of the other tunnels being able to be available on some transmitters broadcasting a DVB-T2 radio signal, the bandwidth necessary for transmitting the data stream by means of a satellite is greatly reduced.

According to a particular embodiment of the invention, one tunnel comprises data on audiovisual streams intended to be broadcast on a national scale and another tunnel comprises data on audiovisual streams intended to be broadcast on a local scale and the packets of the first type are packets belonging to the tunnel comprising data on audiovisual streams intended to be broadcast on a local scale.

Thus, by transmitting only data of the tunnel comprising data on audiovisual streams intended to be broadcast on a national scale, the bandwidth necessary for transmitting the data stream is greatly reduced.

According to a particular embodiment of the invention, the method also comprises the steps of:
 identifying, among the baseband frame packets, packets of a second type, the packets of the second type belonging to a tunnel different from the tunnel to which the packets of the first type belong,
 modifying the header of each baseband frame packet identified as a packet of the second type,
 replacing the useful data included in a useful data field of each packet of the second type identified by information indicating that the packet is a packet of the second type, the information indicating that the packet is a packet of the second type having a size less than the size of the useful data replaced,
 transferring another modified data stream.

Thus is it possible to transmit the other modified data stream by means of another connection, the cost of use of which is less.

According to a particular embodiment of the invention, the method also comprises the steps of:
 inserting, for each frame of the tunnel to which the packets of the first type belong, data included in the signaling packet of the frame of the tunnel in the useful data field of a packet of the first type of the frame of the tunnel,
 inserting, for each frame of the tunnel to which the packets of the second type belong, data included in the signaling packet of the frame of the tunnel in the useful data field of a packet of the second type of the frame of the tunnel,
 modifying the signaling packets of each frame of the tunnel to which the packets of the first type belong and signaling packets of each frame of the tunnel to which the packets of the second type belong.

Thus the modified data streams are completely compatible with the DVB-T2 standard.

According to a particular embodiment of the invention, the baseband frame packets are, according to their position in the frame, sequentially packets of the first type and packets of a second type and the method further comprises the steps of:
 modifying the header of each baseband frame packet identified as a packet of the second type,
 replacing the useful data included in a useful data field of each packet of the second type identified by information indicating that the packet is a packet of the second type, the information indicating that the packet is a packet of the second type having a size less than the size of the useful data replaced,
 transferring another modified data stream.

Thus it is possible to distribute part of the data stream between several connections. It is possible to transmit the other modified data stream by means of another connection, the cost of use of which is less.

The invention also relates to a method for generating a stream from a first and second data stream received, said first and second streams being streams of the T2-MI type, the data streams comprising frames, each frame containing a synchronization packet, a signaling packet giving information on the structure of the data stream and packets referred to as baseband frames comprising data on audiovisual streams, characterized in that the method comprises the steps of:
 aligning (E54) the two data streams received by putting in phase the synchronization packets or the signaling packets of the frames of each data stream,
 adding (E56), in each frame of the first stream received, baseband packets of the frame of the second stream, the synchronization packet of which is aligned with the synchronization packet of the frame of the first stream following the baseband packets of the frame of the first stream received.

The invention also relates to a device for generating a stream from a first and second data stream received, the data streams comprising frames, said first and second streams being streams of the T2-MI type, each frame containing a synchronization packet, a signaling packet giving information on the structure of the data stream and packets referred to as baseband frames comprising data on audiovisual streams, characterized in that the device comprises:
 means for aligning the two data streams received by putting in phase the synchronization packets or the signaling packets of the frames of each data stream received which have the same temporal marking value,
 means for aligning the two data streams received by putting in phase the synchronization packets or the signaling packets of the frames of each data stream,
 means for adding, in each frame of the first stream received, baseband packets of the frame of the second stream, the synchronization packet of which is aligned with the synchronization packet of the frame of the first stream following the baseband packets of the frame of the first stream received.

Thus the bandwidth necessary for receiving one of the data streams is reduced while preserving the data necessary for the synchronous broadcasting of the data stream within a single frequency network SFN.

According to a particular embodiment of the invention, the insertion is made by replacing, in the data stream comprising the identifiers of packets of the first type, of each packet identifying a packet of the first type, with a baseband packet of the frame of the second stream the synchronization packet of which is aligned with the synchronization packet of the frame of the first stream.

According to a particular embodiment of the invention, when a stream is generated from two data streams received:
 in each frame of one of the streams, a packet having a predetermined identifier is detected,
 in a data field of the packet having the predetermined identifier, stuffing data are inserted,
 the predetermined identifier is modified.

According to a particular embodiment of the invention, the frames of the first and second T2-MI streams have identical durations.

According to a particular embodiment of the invention, the method further comprises the steps of:
 reading the content of the current T2-MI L1 packets of each of the first and second T2-MI streams, modifying, from the content of the current T2-MI L1 packets of each of the first and second T2-MI streams read, the content of the current T2-MI L1 packets of the first T2-MI stream so as to take into account the addition of the baseband packets of the T2 frame of the second T2-MI stream in the T2 frames of the first T2-MI stream.

According to a particular embodiment of the invention, the method further comprises the step of:

updating the counters of each T2-MI packet of the T2-MI stream in which the baseband packets of the second T2-MI stream were added.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIGS. 7a to 7h depict various examples of T2-MI streams processed or generated according to the first embodiment of the present invention in order to reduce the bit rate of a T2-MI stream.

DETAILED DESCRIPTION OF THE PREFERRED EMBODIMENTS

Figure 1:
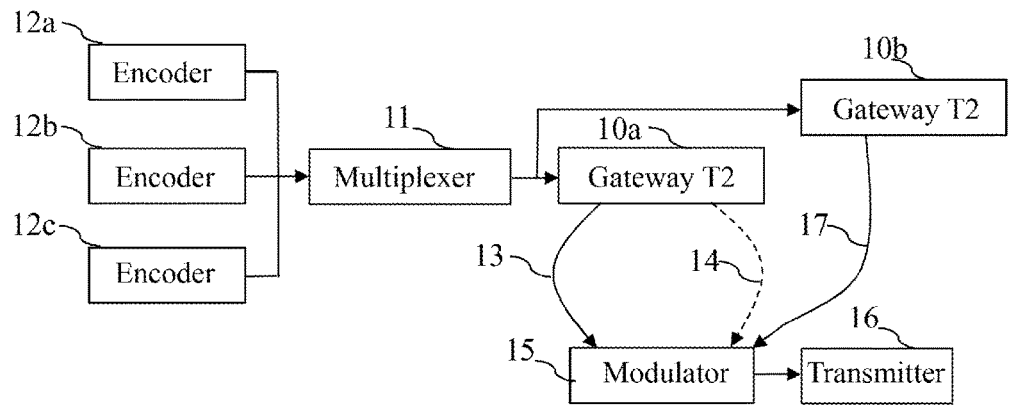
FIG. 1 illustrates the architecture of a DVB-T2 terrestrial broadcasting system according to the present invention.

FIG. 1 illustrates the architecture of a DVB-T2 terrestrial broadcasting system according to the present invention.

Upstream, a set of audio/video encoders 12a, 12b and 12c compresses the programs. The programs are then multiplexed by at least one multiplexer 11, which generates a multiplex to the MPEG-2 MPTS (Multi-Program Transport Stream) format. At least one multiplex is then sent to at least one T2 gateway 10a responsible for encapsulating at least one multiplex in at least one T2-Mi stream.

According to a first embodiment, the T2 gateway 10a reduces the bit rate of at least one T2-MI stream. At least one T2-MI stream the bit rate of which is reduced is itself encapsulated in an MPTS stream. This mechanism is described in the document "Digital Video Broadcasting (DVB); Modular Interface (T2-MI) for a second generation digital terrestrial television broadcasting system (DVB-T2)" referenced "DVB Document A136r2".

At least one T2-MI stream the bit rate of which is reduced and encapsulated in at least one MPTS stream is for example transmitted to several modulators 15 of transmitters 16 for transmitting over one or more regions and all the modulators 15 and transmitters of the same region or more precisely of the same SFN network transmit the modulated signal on the same frequency. It is therefore essential for the various modulators 15 of each transmitter 16 of the same region to be finely synchronized so that the SFN transmission by the various transmitters 16 occurs without any problem. To this end, the T2-MI stream has specific information and in particular synchronization information, typically the T2-MI packet referred to as DVB-T2 timestamp, which implements timestamping allowing this synchronization of the DVB-T2 modulators. This synchronization is based on the fact that time labels, the DVB-T2 timestamp packets, are generated at a single point in the T2 gateway 10a upstream of the broadcasting.

According to a second embodiment, two T2 gateways 10a and 10b transmit respectively a T2-MI stream encapsulated in an MPTS stream.

According to the present invention, each modulator 15 reconstructs a DVB-T2 stream from one or more T2-MI streams.

According to the first embodiment, the T2 gateway 10a transmits at least one T1-MI stream the bit rate of which is reduced by means of at least one connection 13, or even 14.

According to the second embodiment, the T2 gateway 10a transmits at least one T2-MI stream by means of the connection 15, or even 14, and the T2 gateway 10b transmits at least one T2-MI stream by means of the connection 17.

The connection 13 is for example a satellite that receives the T2-MI stream the bit rate of which is reduced and retransmits it to the modulators 15.

The connections 14 and 17 are for example terrestrial connections, such as cable connections. By means of the terrestrial connection 14 or 17, another T2-MI stream the bit rate of which is reduced according to the first embodiment or not according to the second embodiment may be transmitted to the modulator or modulators 15 if necessary.

In FIG. 1, only one modulator 15 and only one transmitter 16 are shown for reasons of simplification.

Figure 2:
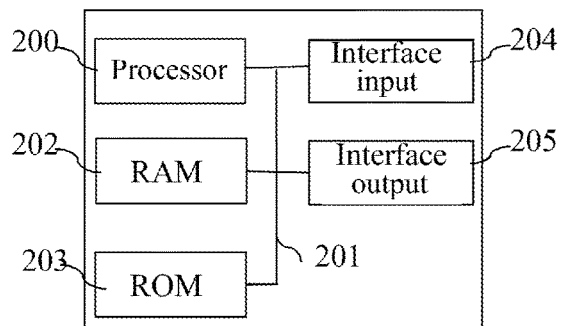
FIG. 2 depicts a device for transferring a T2-MI stream according to a first embodiment of the present invention.

FIG. 2 depicts a device for transferring a T2-MI stream according to the first embodiment of the present invention.

The device for reducing the bit rate of a T2-MI stream is for example included in the T2 gateway 10a. Naturally, the device for reducing the bit rate of a T2-MI stream may be a dedicated device.

The device for reducing the bit rate of a T2-MI stream 10a comprises a communication bus 201 to which there are connected a processor 200, a non-volatile memory 203, a random access memory 202, an interface 204 for communicating with or inputting to the multiplexer 11 and an interface 205 for communicating with or outputting from the modulator 15.

The non-volatile memory 203 stores the software modules implementing the invention, as well as the data for implementing the algorithm, which will be described below with reference to FIG. 4.

In more general terms, the programs according to the present invention are stored in a storage means. This storage means can be read by the microprocessor 200.

When the T2 gateway 10a is powered up, the software modules according to the present invention are transferred into the random access memory 202, which then contains the executable code of the invention as well as the data necessary for implementing the invention.

By means of the interface 204, the T2 gateway 10a receives the original stream from one or more multiplexers 11.

By means of the interface 205, the T2 gateway 10a transfers at least one stream with a reduced bit rate to the modulator 15.

All or some of the steps of the algorithm described below with regard to FIG. 4 can be implemented by software by executing the steps by means of a programmable device such as a microprocessor, a DSP (Digital Signal Processor) or a microcontroller or implemented in a component such as an FPGA (Field-Programmable Gate Array) or and ASIC (Application-Specific Integrated Circuit).

Figure 4:
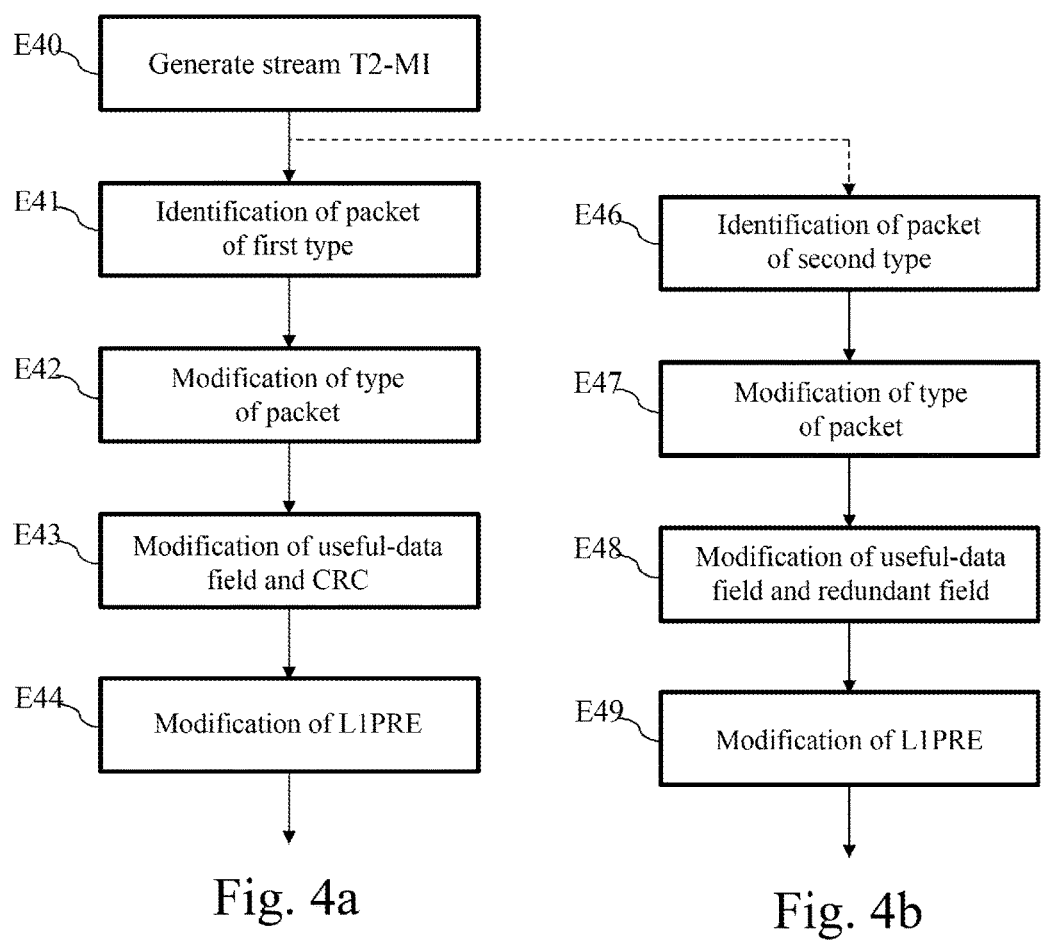
FIG. 4 depict an example of an algorithm for transferring a DVB-T2 stream according to a first embodiment of the present invention.

In other words, the T2 gateway 10a comprises the circuitry that enables the T2 gateway 10a to execute the steps of the algorithm of FIG. 4.

Figure 3:
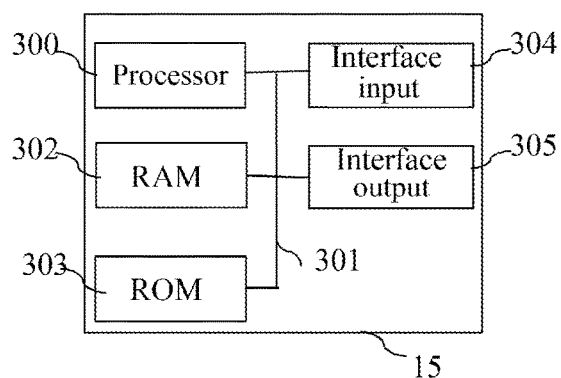
FIG. 3 depicts a device for reconstructing a DVB-T2 stream from at least one T2-MI stream according to the present invention.

FIG. 3 shows a device for reconstructing a DVB-T2 stream from at least one T2-MI stream according to the present invention.

The device for reconstructing a DVB-T2 stream is for example included in the modulator 15. Naturally, the device for reconstructing a DVB-T2 stream may be a dedicated device.

The device for reconstructing a DVB-T2 stream 15 comprises a communication bus 301 to which there are connected a processor 300, a non-volatile memory 303, a random access memory 302, an interface for receiving signals and an interface 305 for outputting from the transmitter 16.

The non-volatile memory 303 stores the software modules implementing the invention, as well as the data for implementing the algorithm that will be described below with reference to FIG. 5.

More generally, the programs according to the present invention are stored in a storage means. This storage means can be read by the microprocessor 300.

When the modulator 15 is powered up, the software modules according to the present invention are transferred into the random access memory 302, which then contains the executable code of the invention as well the data necessary for implementing the invention.

By means of the interface 304, the modulator receives at least one T2-MI stream, by means of the connection 13 or even the connection 14 according to the first embodiment or by means of the connections 13 and 17 according to the second embodiment.

By means of the interface 305, the modulator transposes in frequency the reconstructed stream for transmission by the transmitter 16 of the stream reconstructed and transposed in frequency.

All or some of the steps of the algorithm described below with regard to FIG. 5 can be implemented by software by executing the steps by means of a programmable device such as a microprocessor, a DSP (Digital Signal Processor) or a microcontroller or implemented in a component such as an FPGA (Field-Programmable Gate Array) or an ASIC (Application-Specific Integrated Circuit).

Figure 5:
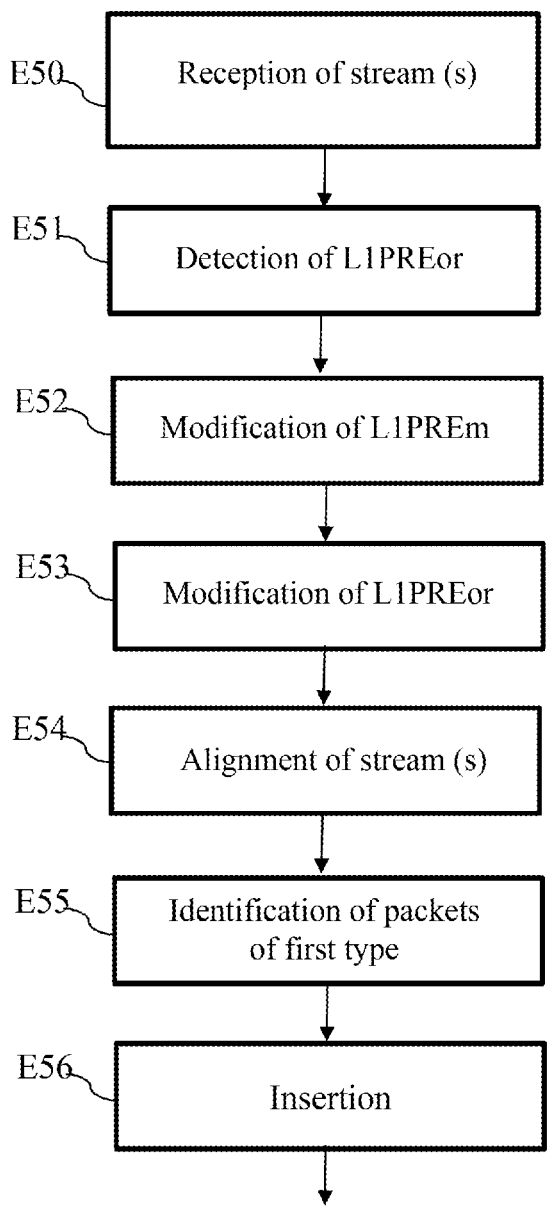
FIG. 5 depicts an example of an algorithm for reconstructing a DVB-T2 stream from at least one T2-MI stream according to the present invention.

In other words, the modulator 15 comprises circuitry that enables the modulator 15 to execute the steps of the algorithm in FIG. 5.

FIG. 4a shows an example of an algorithm for transferring a DVB-T2 stream according to the first embodiment of the present invention.

More precisely, the present algorithm is executed by the processor 200 of the device for reducing the bit rate of a T2-MI stream.

At step E40, the processor 200 receives from the multiplexer 11 at least one multiplex to the MPEG-2 MPTS format and generates at least one T2-MI stream.

A T2-MI stream comprises T2-MI data packets such as T2-MI timestamp synchronization packets, signaling packets including the packet referred to as current LI or L1PRE that gives information on the structure of the T2-MI stream and packets referred to as baseband frames containing the data of the MPEG-2 TS streams of one or more PLP tunnels. The T1-MI packets are organized in T2 frames, and each T2 frame contains a T2-MI timestamp packet, a current T2-MI L1 packet and baseband frame packets.

According to a first example embodiment, the T2-MI stream received comprises packets of at least two different PLP tunnels as described with reference to FIG. 7a.

According to a second example embodiment, the T2-MI stream received comprises a first so-called main tunnel containing audiovisual programs that are to be broadcast at a national level and at least one second tunnel containing so-called regional audiovisual programs as described with reference to FIG. 7a.

According to a third example embodiment, the T2-MI stream received comprises a packet of a single PLP tunnel as described with reference to FIG. 7f.

At the following step E41, the processor 200 identifies packets said to be of a first type in the T2-MI stream generated.

The packets said to be of the first type are, in the first example embodiment, the baseband frame packets of the first tunnel.

The packets said to be of the first type are, in the second example embodiment, the baseband frame packets of the second tunnel containing so-called regional audiovisual programs.

The packets said to be of the first type are, in the third example embodiment, the baseband frame packets that are counted by the processor 200 and identified as even. In other words, the baseband frame packets are, according to their position in the frame T2, sequentially packets of the first type and packets of a second type.

At the following step E42, the processor 200 modifies the header of each T2-MI packet identified as a packet of the first type.

Figure 6:
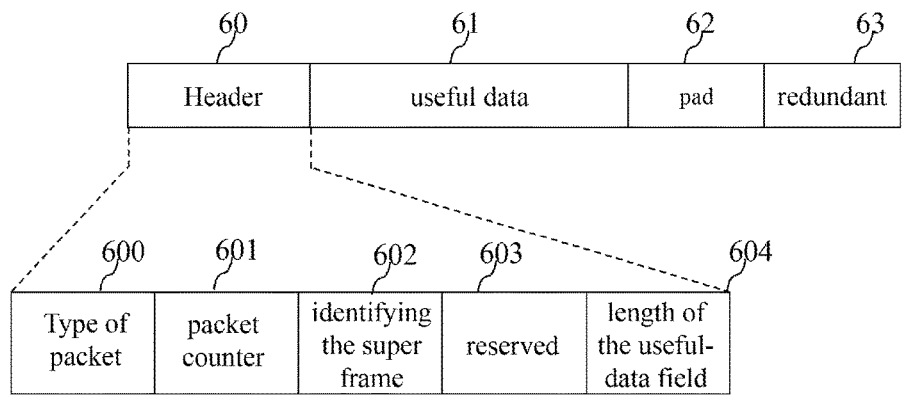
FIG. 6 depicts an example of the structure of a T2-MI packet.

FIG. 6 depicts an example of the structure of a T2-MI packet.

A T2-MI packet comprises a header 60, a useful-data field, a stuffing field 62 and a redundant field 63.

The header field 60 comprises a subfield 600 for identifying the type of packet, a packet-counter subfield 601, a subfield 602 identifying the superframe to which the packet belongs, a subfield 603 reserved for future changes and a subfield 604 that defines the length of the useful-data field 61.

The packet-type subfield 600 is modified at step E42 by replacing the value of the field, conventionally 00 in hexadecimal, with the value 40 in hexadecimal. The value 40 is a value reserved for uses other than those conventionally defined by the DVB-T2 standard.

At the following step E43, the processor 200 modifies the useful-data field 61 by replacing all the useful data included in the field 61 with information indicating that the packet is a packet of the first type, the information having a size less than the size of the useful data replaced.

For example, the information indicating that the packet is a packet of the first type is a single byte that identifies the first type of packet.

At this same step E43, the processor 200 modifies the value of the redundant field 63 and the value of the subfield 604 by updating them so as to take into account the previously made modifications.

In a particular embodiment of the first example embodiment, the processor 200 modifies the content of the current T2-MI L1 packet at step E44. A current T2-MI L1 packet comprises information identifying the number of PLP tunnels included in the T2-MI stream.

According to the first example embodiment, the T2-MI stream originally comprising two PLP tunnels now comprises only one PLP tunnel. The content of the current T2-MI L1 packet is then modified in order to take the modification into account.

According to a particular embodiment, the processor 200 copies, for example, in the useful-data field 61 of the last packet of the first type, the content of the useful-data field of the current T2-MI L1 packet and, according to the example, modifies the identifier included in the subfield 600 of the last packet of the first type by putting for example the value 41 in hexadecimal.

The T2-MI stream thus comprises a smaller quantity of data and is thus adapted to the bit rate of the connection used for the transmission of said T2-MI stream.

According to the first and third example embodiments, the processor 200 forms two T2-MI streams and, in parallel to steps E42 to E44, executes steps E46 to E49 of the algorithm in FIG. 4b.

At step E46, the processor 200 identifies packets said to be of a second type in the T2-MI stream generated.

The packets said to be of the second type are, in the first example embodiment, the baseband frame packets of the second tunnel.

The packets said to be of the second type are, in the third example embodiment, the baseband frame packets that are counted by the processor 200 and identified as odd.

At the following step E47, the processor 200 modifies the header of each T2-MI packet identified as a packet of the second type.

The packet-type subfield 600 is modified at step E47 by replacing the value of the field, conventionally 00 in hexadecimal, with the value 40 in hexadecimal. The value 40 is a value reserved for uses other than those conventionally defined by the DVB-T2 standard.

At the following step E48, the processor 200 modifies the useful-data field 61 by replacing all the useful data included in the field 61 with information indicating that the packet is a packet of the second type, the information having a size less than the size of the useful data replaced.

For example, the information indicating that the packet is a packet of the second type is a single byte that identifies the first type of packet.

At this same step E48, the processor 200 modifies the value of the redundant field 63 and the value of the subfield 604 by updating them sol as to take into account the previously made modifications.

In a particular embodiment of the first example embodiment, the processor 200 modifies the content of the current T2-MI L1 packet at step E49. A current T2-MI L1 packet comprises information identifying the number of PLP tunnels included in the T2-MI stream. The T2-MI stream originally comprised two PLP tunnels and now comprises only one PLP tunnel. The content of the current T2-MI L1 packet is then modified in order to take the modification into account.

According to the particular embodiment, the processor 200 copies, for example into the useful-data field 61 of the last packet of the second type, the content of the useful-data field of the current T2-MI L1 packet and modifies the identifier included in the subfield 600 of the last packet of the first type by putting for example the value 41 in hexadecimal.

Figure 7A:
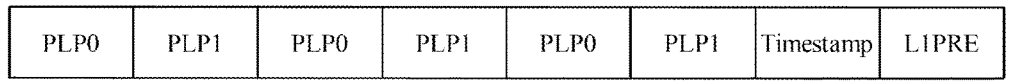

FIG. 7a depicts a T2-MI stream according to the first and second example embodiments.

The T2-MI stream received comprises baseband frame packets of the first tunnel denoted PLP0 and baseband frame packets of the second tunnel denoted PLP1. The T2-MI packets are organized in T2 frames, each T2 frame contains a T2-MI timestamp packet, a current T2-MI L1 packet and baseband frame packets PLP0 and PLP1.

Figure 7B:
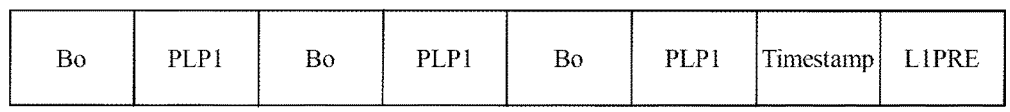

FIG. 7b depicts a T2-MI stream formed according to the first and second example embodiments of the present invention.

The baseband packets PLP0 of the first tunnel are replaced by packets denoted Bo.

Figure 7C:
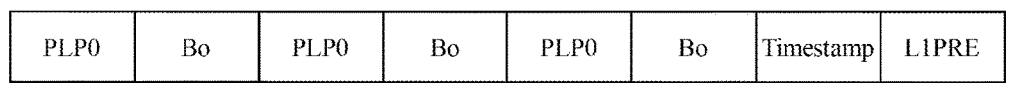

FIG. 7c depicts a second T2-MI stream formed according to the first example embodiment of the present invention.

The baseband packets PLP1 of the second tunnel are replaced by packets denoted Bo.

FIG. 7d depicts a T2-MI stream formed according to the particular embodiment of the first example embodiment of the present invention.

The baseband packets PLP0 of the first tunnel are replaced by packets denoted Bo. The value of the current L1 packet L1PRE is updated and is denoted L1PREm. The useful data of the packet L1PRE of FIG. 7a are copied into the useful-data field 61 of the last packet of the first type denoted L1PREor. The content of the useful-data field of the current T2-MI L1 packet denoted L1PREm is updated according to the data parameters transmitted. The identifier included in the subfield 600 of the last packet of the first type is modified by putting for example the value 41 in hexadecimal.

FIG. 7e depicts a T2-MI stream formed according to the particular implementation of the first and second example embodiments of the present invention.

The baseband packets PLP1 of the first tunnel are replaced by packets denoted Bo. The value of the current L1 packet L1PRE is updated and is denoted L1PREm. The useful data of the packet L1PRE of FIG. 7a are copied into the useful-data field 61 of the last packet of the first type denoted L1PREor. The content of the useful-data field of the current T2-MI L1 packet denoted L1PREm is updated according to the data parameters transmitted. The identifier included in the subfield 600 of the last packet of the second type is modified by putting for example the value 41 in hexadecimal.

FIG. 7f depicts a T2-MI stream according to a third example embodiment.

The T2-MI stream received comprises baseband frame packets of a single tunnel. The T2-MI packets are organized in T2 frames, each T2 frame contains a T2-MI timestamp, a current T2-MI L1 packet and baseband frame packets.

The baseband frame packets are denoted BB0 to BB5.

FIG. 7g depicts a first T2-MI stream formed according to the third example embodiment of the present invention.

The baseband packets identified as even are replaced by packets denoted Bo.

FIG. 7h depicts a second T2-MI stream formed according to the third example embodiment of the present invention.

The baseband packets identified as odd are replaced by packets denoted Bo.

It should be noted here that the examples given with reference to FIG. 7 are examples in which the T2-MI stream is decomposed into two T2-MI streams. Naturally a T2-MI stream according to the invention may be decomposed into a larger number of T2-MI streams.

FIG. 5 depicts an example of an algorithm for reconstructing a DVB-T2 stream from at least one DVB-T2 stream according to the present invention.

More precisely, the present algorithm is executed by the processor 300.

At step E50, the processor 300 detects the reception of two T2-MI streams, at least one T2-MI stream of which is formed by the T2 gateway 10*a* according to the present invention.

According to the first and third example implementations of the first embodiment, two T2-MI streams formed according to the algorithm in FIGS. 4*a* and 4*b* are received by means of the connections 13 and 14.

According to the second example implementation of the first embodiment, a T2-MI stream formed according to the algorithm in FIG. 4*a* is received by means of the connection 13 and a regional stream is received from a device that is not shown in FIG. 1.

According to the particular embodiment of the first example embodiment, the processor 300 performs, following step E50, the steps E51 to E53.

According to the second embodiment, a first T2-MI stream is received via the connection 13 and a second T2-MI stream is received via the connection 17.

It should be noted here that, in the second embodiment, the frames of the first and second T2-MI streams have identical durations.

At this same step, the processor 300 reads the content of the current T2-MI L1 packets of each of the first and second T2-MI streams.

According to the first embodiment, the processor 300 passes from step E50 to step E51 and, in each T2 frame of at least one T2-MI stream formed according to the algorithm in FIG. 4*a* or 4*b*, detects an LIPREor packet.

At the following step E52, the processor 300 inserts, in the field 61 of the L1PREm packet of the T2 frame, the content of the field 61 of the L1PREor packet detected.

At the following step E53, the processor 300 modifies the L1PREor packet, replacing the content of the useful-data field 61 of the last packet with stuffing data, modifies the identifier included in the subfield 600 of the last packet of the first type, putting for example the value 00 in hexadecimal, and updates the field 62 and the subfield 604.

According to the first embodiment, the processor 300 passes from step E53 to step E54. According to the second embodiment, the processor 300 passes from step E50 to step E54.

At step E54, the processor 300 aligns the two streams received at step E50. The alignment is made by putting in phase the T2-MI timestamp packets of the T2 frames of each T2-MI stream.

For example, the processor 300 aligns the two streams received by putting in phase the T2-MI timestamp packets of the T2 frames of each T2-MI stream received that have the same time marking value or time marking values that are the closest.

In a variant, the alignment is made by putting in phase the current T2-MI L1 packets of the T2 frames of each T2-MI stream received that have the same T2-MI counter value or T2-MI counter values that are the closest.

It should be noted here that the processor 300 may align the two streams received using other methods.

According to the first embodiment, the processor 300 passes from step E54 to E55.

At step E55, the processor 300 identifies, in one of the T2-MI streams received from the T2 gateway 10*a*, the packets of the first type by analyzing the useful-data field 61 of the packets received.

According to the first embodiment, the processor 300 passes from step E55 to step E56. According to the second embodiment, the processor 300 passes from step E54 to step E56.

At step E56, the processor 300 inserts, in each T2 frame of a first T2-MI stream received, the baseband packets of the T2 frame of the second T2-MI stream, the T2-MI packet of which is aligned with the T2-MI packet of the frame of the first T2-MI stream.

According to the first embodiment, the processor 300, in the T2-MI stream comprising the identifiers of packets of the first type, replaces each packet of the first type with the packet of the second T2-MI stream received that is aligned with the packet of the first type identified.

In a variant of the first embodiment, step E54 is broken down into two substeps.

In a first substep, the processor 300, in the T2-MI stream comprising the identifiers of packets of the first type, replaces each packet of the first type identifying a packet of the first type with stuffing data the size of which is equal to the size of the other baseband packets included in the T2-MI stream.

In a second substep, the processor 300 replaces the stuffing data inserted at the previous substep with the packet of the second T2-MI stream received that is aligned with the packet of the first type identified.

According to the second embodiment, the processor 300 inserts, or more precisely adds, in each T2 frame of a first T2-MI stream received, the baseband packets of the T2 frame of the second T2-MI stream the T2-MI packet of which is aligned with the T2-MI packet of the frame of the first T2-MI stream following the baseband packets of the T2 frame of the first T2-MI stream. From the content of the current T2-MI L1 packets of each of the first and second T2-MI streams read at step E50, the processor 300 modifies the content of the current T2-MI L1 packets of the first T2-MI stream so as to take into account the addition of the baseband packets of the T2 frame of the second T2-MI stream in the T2 frames of the first T2-MI stream. The processor 300 updates the counters of each T2-MI packet of the T2-MI stream in which the baseband packets of the second T2-MI stream were added.

It should be noted here that, if the first T2-MI stream comprises several physical-layer tunnels PLP, the processor 300 may delete the packets associated with at least one of the tunnels.

Likewise, it should be noted here that, if the second T2-MI stream comprises several physical-layer tunnels PLP, the processor 300 can add only the packets associated with some of the physical-layer tunnels PLP of the second T2-MI stream.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method performed by a processor for generating a stream from a first and second data stream received by an interface in communication with the processor, the method comprising the steps of:
   the interface receiving the first and second data streams, said received first and second data streams being streams of the T2-MI type, the data streams comprising frames, each frame containing a synchronization packet, a signaling packet giving information on the structure of the data stream and packets referred to as baseband frames comprising data on audiovisual streams;
   the processor aligning the first and second data streams received by the interface by putting in phase the synchronization packet or the signaling packet of the respective frames of each of the first and second data streams,
   the processor adding, in each respective frame of the first data stream received, baseband packets of the respective frame of the second data stream, the synchronization packet of which is aligned with the synchronization packet of the respective frame of the first stream following the baseband packets of the respective frame of the first stream received to generate the stream.

2. The method according to claim 1, wherein the adding comprises replacing, in the data stream comprising identifiers of packets of a first type, each packet identifying a packet of the first type with a baseband packet of the frame of the second stream, the synchronization packet of which is aligned with the synchronization packet of the frame of the first stream.

3. The method according to claim 2, wherein the method further comprises the steps of:
   detecting, in each frame of one of the streams, a packet having a predetermined identifier,
   inserting in a data field of the signaling packet of the frame, data included in a data field of the packet having the predetermined identifier,
   inserting stuffing data in a data field of the packet having the predetermined identifier, and
   modifying the predetermined identifier.

4. The method according to claim 2, wherein the baseband frame packets are, according to their position in the frame, sequentially packets of the first type and packets of a second type and in that the method further comprises the steps of:
   modifying the header of each baseband frame packet identified as a packet of the second type,
   replacing the useful data included in a useful data field of each packet of the second type identified by information indicating that the packet is a packet of the second type, the information indicating that the packet is a packet of the second type having a size less than the size of the useful data replaced, and
   transferring another modified data stream.

5. The method according to claim 1, wherein at least one of the two streams is received from a distant device, said distant device, prior to the transfer of said stream, performing the steps of:
   identifying, among the baseband frame packets, packets of a first type,
   modifying the header of each baseband frame packet identified as a packet of the first type,
   replacing the useful data included in a useful data field of each identified packet with information indicating that the packet is a packet of the first type, the information indicating that the packet is a packet of the first type having a size less than the size of the useful data replaced, and
   transferring the modified data stream.

6. The method according to claim 5, wherein each of the baseband frame packets belongs to one of a plurality of tunnels and wherein the packets of the first type are the packets belonging to a same tunnel.

7. The method according to claim 6, wherein a tunnel comprises data on audiovisual streams intended to be broadcast on a national scale and a tunnel comprises data on audiovisual streams intended to be broadcast on a local scale, and wherein the packets of the first type are packets belonging to the tunnel comprising data on audiovisual streams intended to be broadcast on a local scale.

8. The method according to claim 6, wherein the method further comprises the steps of:
   identifying, among the baseband frame packets, packets of a second type, the packets of the second type belonging to a tunnel different from the tunnel to which the packets of the first type belong,
   modifying the header of each baseband frame packet identified as a packet of the second type,
   replacing the useful data included in a useful data field of each packet of the second type identified by information indicating that the packet is a packet of the second type, the information indicating that the packet is a packet of the second type having a size less than the size of the useful data replaced, and
   transferring another modified data stream.

9. The method according to claim 8, wherein the method further comprises the steps of:
   inserting, for each frame of the tunnel to which the packets of the first type belong, data included in the signaling packet of the frame of the tunnel in the useful data field of a packet of the first type of the frame of the tunnel,
   inserting, for each frame of the tunnel to which the packets of the second type belong, data included in the signaling packet of the frame of the tunnel in the useful data field of a packet of the second type of the frame of the tunnel, and
   modifying the signaling packets of each frame of the tunnel to which the packets of the first type belong and signaling packets of each frame of the tunnel to which the packets of the second type belong.

10. The method according to claim 1, wherein the frames of the first and second T2-MI streams have identical durations.

11. The method according to claim 1, further comprising the steps of:
   reading the content of the current T2-MI L1 packets of each of the first and second T2-MI streams, and
   modifying, from the content of the current T2-MI L1 packets of each of the first and second T2-MI streams read, the content of the current T2-MI L1 packets of the first T2-MI stream so as to take into account the addition of the baseband packets of the T2 frame of the second T2-MI stream in the T2 frames of the first T2-MI stream.

12. The method according to claim 11, further comprising the step of:
   updating counters of each T2-MI packet of the T2-MI stream in which the baseband packets of the second T2-MI stream were added.

13. A device for generating a stream from first and second data streams comprising:

an interface configured for receiving the first and second data streams, said first and second data streams being streams of the T2-MI type, the data streams comprising frames, each frame containing a synchronization packet, a signaling packet giving information on the structure of the data stream and packets referred to as baseband frames comprising data on audiovisual streams;

a processor configured for aligning the first and second data streams received by the interface by putting in phase the synchronization packets or the signaling packets of the frames of each data stream received which have the same temporal marking value, the processor configured for aligning the first and second data streams received by the interface by putting in phase the synchronization packet or the signaling packet of the respective frames of each of the first and second data streams, and the processor configured for adding, in each respective frame of the first data stream received by the interface, baseband packets of the respective frame of the second data stream received by the interface, the synchronization packet of which is aligned with the synchronization packet of the respective frame of the first data stream following the baseband packets of the respective frame of the first data stream received to generate the stream.

14. A system comprising:

a first device for generating a stream from first and second data streams, the first device comprising:

an interface configured for receiving the first and second data streams, the data streams comprising frames, said first and second data streams being streams of the T2-MI type, each frame containing a synchronization packet, a signaling packet giving information on the structure of the data stream and packets referred to as baseband frames comprising data on audiovisual streams;

a processor of the first device in communication with the interface, the processor configured for aligning the first and second data streams received by the interface by putting in phase the synchronization packet or the signaling packet of the respective frames of each of the first and second data streams received which have the same temporal marking value, the processor of the first device configured for aligning the first and second data streams received by the interface by putting in phase the synchronization packet or the signaling packet of the respective frames of the first and second data streams, and the processor of the first device configured for adding, in each respective frame of the first data stream received by the interface, baseband packets of the respective frame of the second data stream, the synchronization packet of which is aligned with the synchronization packet of the respective frame of the first data stream following the baseband packets of the respective frame of the first data stream received by the interface to generate the stream, and a second device having a processor for transferring at least one of the first or the second data stream to the first device, the second device comprising:

a processor of the second device configured for identifying, among the baseband frame packets, packets of a first type, the processor of the second device configured for modifying the header of each baseband frame packet identified as a packet of the first type, the processor of the second device configured for replacing the useful data included in a useful data field of each identified packet with information indicating that the packet is a packet of the first type, the information indicating that the packet is a packet of the first type having a size less than the size of the useful data replaced, and the processor of the second device configured for transferring the modified data stream to the first device as the at least one of the first or the second data stream.

* * * * *